May 15, 1956     E. JOHNSON     2,745,565
STONE LOADER ATTACHMENT FOR A TRACTOR
Filed April 22, 1955     3 Sheets-Sheet 2
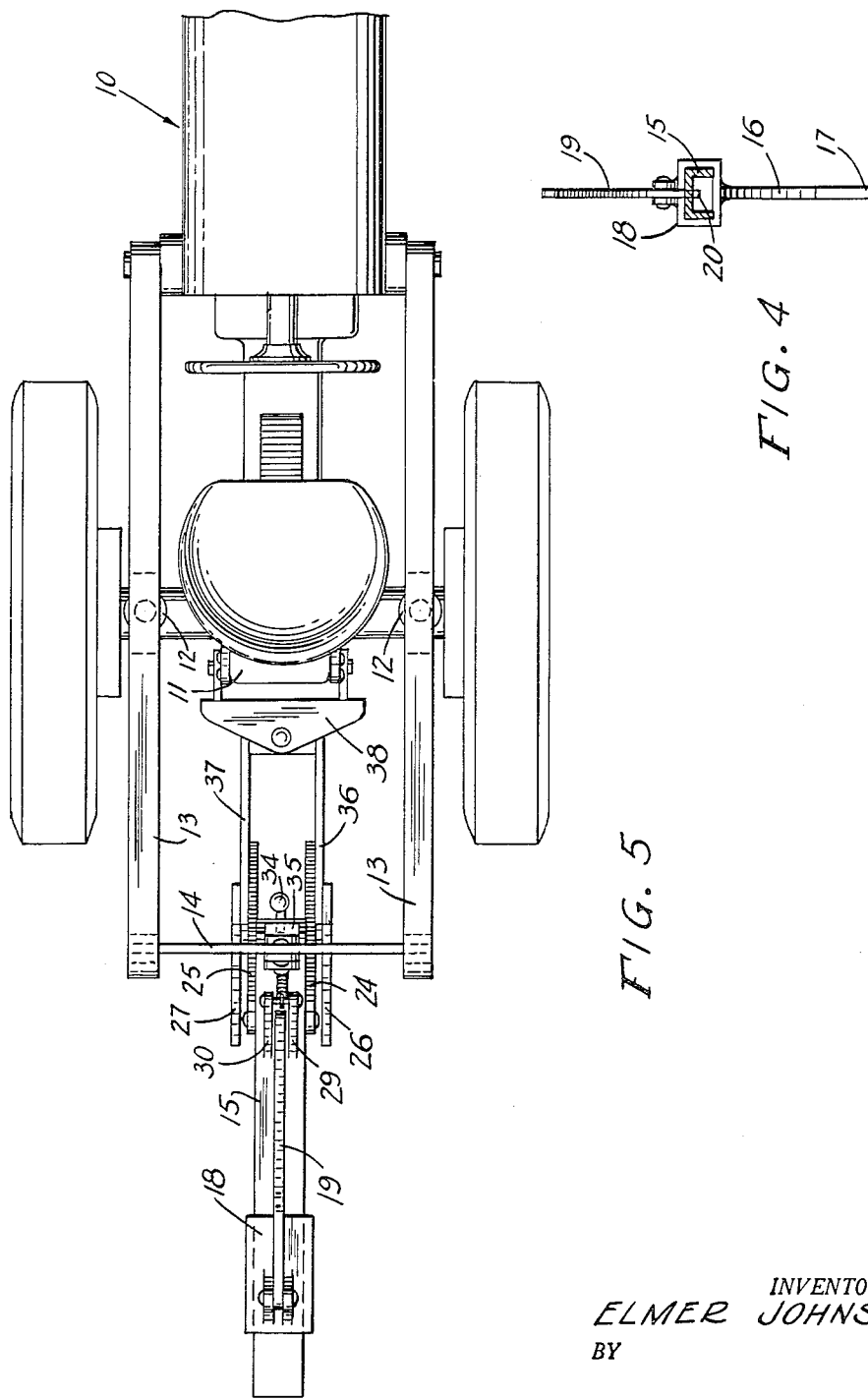
*INVENTOR.*
ELMER JOHNSON
BY
*ATTORNEYS*

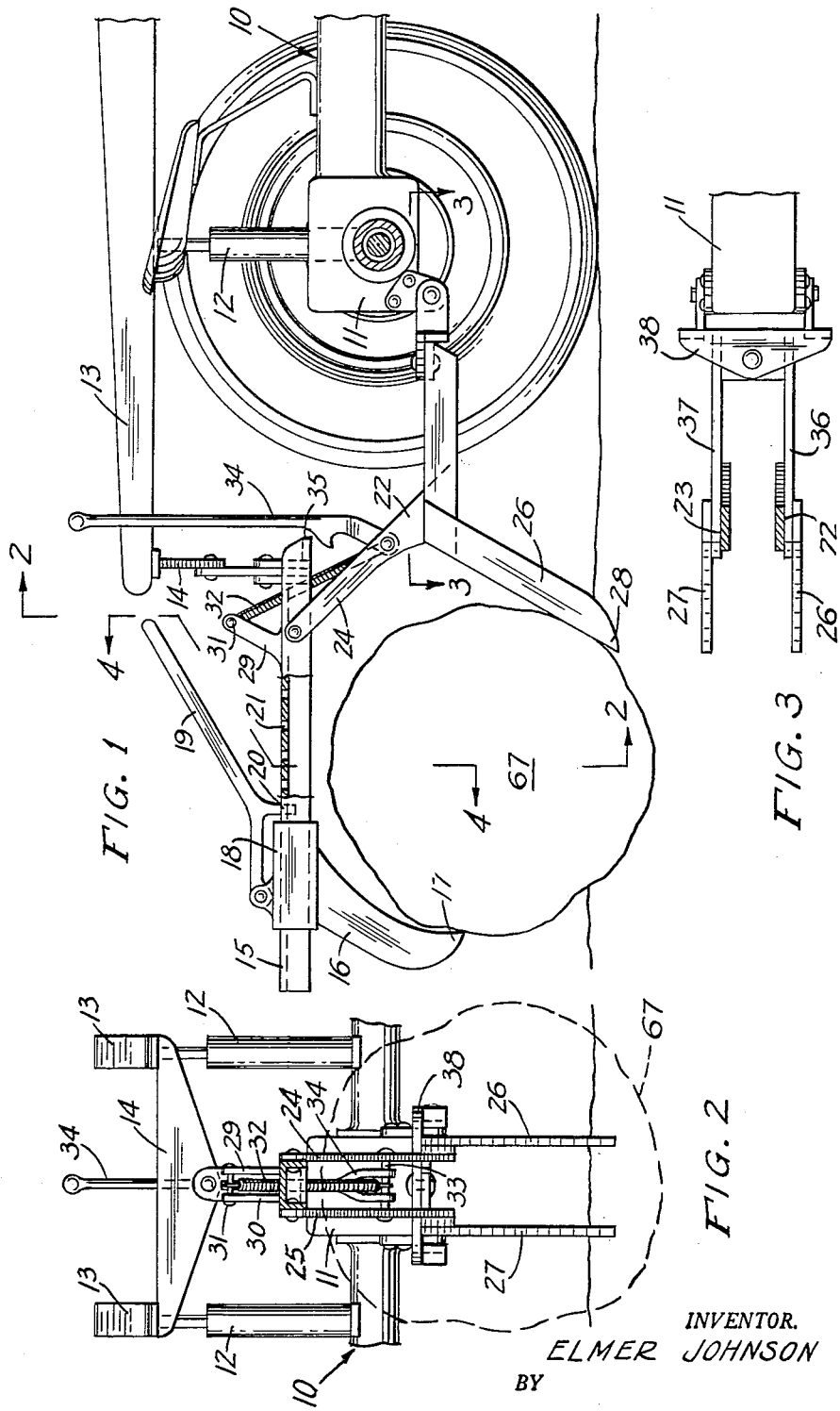

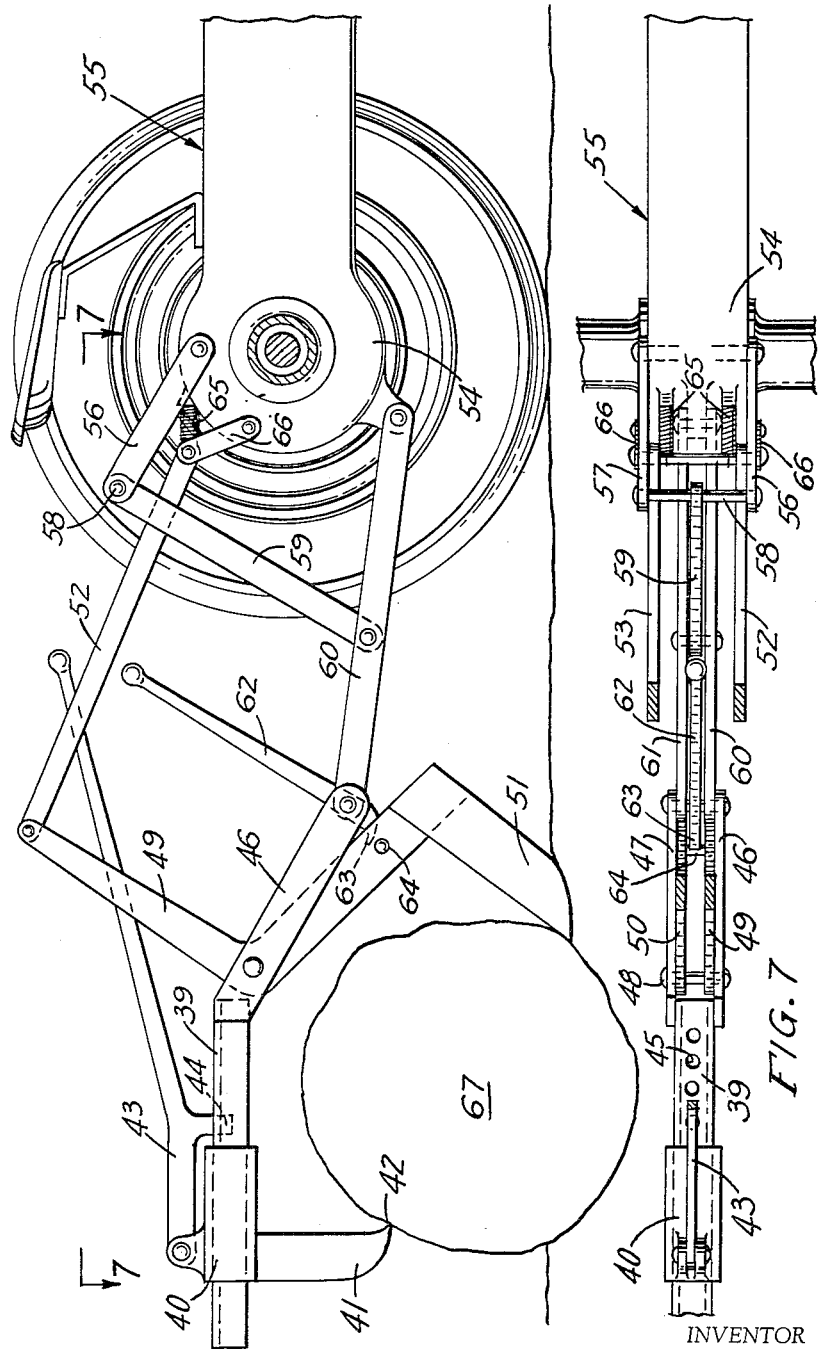

United States Patent Office 2,745,565
Patented May 15, 1956

2,745,565
STONE LOADER ATTACHMENT FOR A TRACTOR

Elmer Johnson, Portage, Wis.

Application April 22, 1955, Serial No. 503,123

3 Claims. (Cl. 214—147)

The present invention relates to a stone loader for use with a tractor having a power lift or a power hitch.

The primary object of the present invention is to provide a stone loader and digger for a tractor and one which automatically engages a stone between opposing arms or prongs when the power lift is raised.

Another object of the present invention is to provide a stone digger and loader of sturdy construction, simple in design and structure, and one which can be manufactured economically and used with all makes of tractors.

These and other objects and advantages of the present invention will be fully apparent from the following description when taken in connection with the annexed drawings, in which:

Figure 1 is a side view in elevation of the rear portion of a tractor showing the stone loader and digger of the present invention engaging a stone, Figure 2 is a rear view in elevation as seen on line 2—2 of Figure 1, Figure 3 is a partial vertical view on line 3—3 of Figure 1, Figure 4 is a partial end view as seen on line 4—4 of Figure 1, Figure 5 is a top plan view of the present invention shown in Figure 1, Figure 6 is a side view in elevation partially in cross-section of a tractor rear wheel and rear axle housing with a second embodiment of the present invention installed thereon engaging a stone, and Figure 7 is a vertical view of the embodiment shown in Figure 6 as seen on line 7—7 of Figure 6.

Referring in greater details to the drawings in which like numerals indicate like parts throughout the several views, a first embodiment of the present invention is shown in Figures 1, 2, and 5, in which will be seen a portion of a tractor 10 having a rear axle housing 11 and a pair of hydraulic lift cylinder and piston assemblies 12 constituting a power lift mounted on the rear axle housing and having upward and downward movements. A hitch bar 13 extends from the power lift and is connected by a cross-bar 14 to one end of an arm 15, the latter extending in tandem relation with respect to the tractor 10 and longitudinally thereof.

The other end of the arm 15 dependingly carries a jaw 16 terminating in a rock-engaging point 17, the jaw 16 being fixed to a sleeve 18 which slides on the arm 15 for movement toward and away from the tractor 10. A handle 19 is pivotally connected to the sleeve 18 and has a downwardly projecting pin 20 engageable in any selected one of a series of holes 21 in the upper face of the sleeve 18. A pair of other jaws 22 and 23 arranged in parallel spaced relation have their upper end portions 24 and 25, respectively, connected to the arm 15 at a point spaced from its connection to the cross bar 14 and have their lower end portions 26 and 27, respectively, facing rearwardly of the tractor 10 and toward the jaw 16, each of the lower end portions 26 and 27 having at its free end a rock-engaging point or prong 28. The arm 15 is fabricated of channel iron or steel, as seen in end view in Figures 2 and 4, and is inverted with its outer face facing upwardly, there being provided a pair of upright arms 29 and 30 having their lower ends welded or otherwise secured to the outer face of the arm 15 and having their upper ends connected by a pin 31. A coil spring 32 has its one end connected to the pin 31 and has its other end connected to a pin 33 extending between the jaws 22 and 23, the pin 33 forming a mounting for the bifurcated lower end of a latch 34.

The latch 34 is engageable with a lip 35 formed on the adjacent end of the arm 15 to hold the lower end portions 26 and 27 of the jaws 22 and 23, respectively, out of their rock-engaging position, the spring 32 being arranged so as to assist in raising the jaws 22 and 23 to the latching position.

The intermediate portions of the jaws 22 and 23 are connected by bars 36 and 37, respectively, to a hitch plate 38 which, in turn, is pivotally connected to the axle housing 11 so that the lower end portions 26 and 27 may swing from their upright position to a position substantially horizontal supporting a stone on the prongs 28.

In the second embodiment shown in Figures 6 and 7, the stone loader comprises an arm 39 having a slidable sleeve 40 carrying a jaw 41, the latter being provided with a forwardly facing point 42. Means is provided for adjustably locking the jaw 41 on the arm 39 and includes the handle 43 pivotally connected to the sleeve 40 and having a pin 44 engageable in holes 45 in the upper face of the arm 39, the arm in this embodiment also being fabricated of channnel iron or steel.

The one end of the arm 39 is bifurcated and formed from a pair of plates 46 and 47 spaced apart from each other and having a pivot pin 48 extending therethrough on which is pivotally connected the pair of jaws 49 and 50, each having a stone-engaging point or prong 51 on its lower end portion. The upper end portion of each of the jaws 49 and 50 are connected to the drawbars 52 and 53, respectively, at one end of the latter.

The hydraulic lift mechanism of the tractor shown in this embodiment is incorporated within the axle housing 54, the tractor being indicated by the reference numeral 55, the power lift having external arms 56 and 57 swingable about a horizontal axis. The free ends of the arms 56 and 57 are connected by a pin 58. A link 59 has its upper end connected to the pin 58 and its lower end connected to the center of a pair of bars 60 and 61 which have their forward ends pivotally connected to the axle housing 54 and their other ends pivotally connected to the ends of the plates 46 and 47, respectively.

A latch 62 has its lower end provided with a hook 63 engageable with a pin 64 extending between the jaws 49 and 50 for securing the jaws in an open position with the prongs 51 swung forwardly. A compression spring 65 and a link 66 connects each of the drawbars 52 and 53 to the axle housing. The compression spring 65 biases the drawbars rearwardly to swing the jaws away from their rock-engaging position.

In use, the stone loader assembly of either of the embodiments here shown and described is operated in the same manner. The tractor is backed up so that the rearwardly facing jaws enter the ground underneath a stone 67 and upon further movement of the tractor rearwardly the stone is dug from the ground. The first jaw is disposed intermediate the pair of jaws and is slidable upon the arm of either of the embodiments and after a stone is engaged by the pair of jaws the first jaw is then moved to a forwardly position where its point engages the stone and the power lift of the tractor is then raised, the leverage of the linkage of either of the assemblies serving to draw the pair of jaws toward the first jaw in a stone-engaging position and lifting the stone upwardly to where it can be placed upon a vehicle.

What is claimed is:

1. The combination with a tractor having a rear axle housing and a power lift having upward and downward movements, of a stone loader comprising an arm arranged in tandem spaced relation with respect to said rear axle housing and having one end connected to the power lift for movement therewith, a first jaw positioned so as to face toward said axle housing adjacent the other end of said arm and fixedly attached to said arm, and a pair of jaws arranged in parallel spaced relation positioned so as to face said first jaw below and adjacent said one end of said arm and operatively connected to said rear axle housing and to said arm for movement toward said first jaw upon execution of upward movement of said power lift, said first jaw being disposed intermediate said pair of jaws.

2. The combination with a tractor having a rear axle housing and a power lift having upward and downward movements, of a stone loader comprising an arm arranged in tandem spaced relation with respect to said rear axle housing and having one end connected to the power lift for movement therewith, a first jaw positioned so as to face toward said axle housing adjacent the other end of said arm and fixedly attached to said arm, a pair of jaws arranged in parallel spaced relation positioned so as to face said first jaw below and adjacent said one end of said arm and operatively connected to said rear axle housing and to said arm for movement toward said first jaw upon execution of upward movement of said power lift, said first jaw being disposed intermediate said pair of jaws, and spring means urging said pair of jaws away from said first jaw.

3. The combination with a tractor having a rear axle housing and a power lift having upward and downward movements, of a stone loader comprising an arm arranged in tandem spaced relation with respect to said rear axle housing and having one end connected to the power lift for movement therewith, a first jaw positioned so as to face toward said rear axle housing adjacent the other end of said arm and selectively attachable to said arm inwardly of said other end thereof, a pair of jaws arranged in parallel spaced relation positioned so as to face said first jaw below and adjacent said one end of said arm and operatively connected to said rear axle housing and to said arm for movement toward said first jaw upon execution of upward movement of said power lift, said first jaw being disposed intermediate said pair of jaws, and spring means urging said pair of jaws away from said first jaw.

No references cited.